United States Patent
Chang et al.

(10) Patent No.: US 12,508,346 B2
(45) Date of Patent: Dec. 30, 2025

(54) MULTILAYER CORNEA HARVESTING APPARATUS AND CORNEA HARVESTING METHOD USING SAME

(71) Applicant: THE CATHOLIC UNIVERSITY OF KOREA INDUSTRY-ACADEMIC COOPERATION FOUNDATION, Seoul (KR)

(72) Inventors: Dong Jin Chang, Seoul (KR); Hosik Hwang, Seoul (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 852 days.

(21) Appl. No.: 17/782,265

(22) PCT Filed: Aug. 7, 2020

(86) PCT No.: PCT/KR2020/010481
§ 371 (c)(1),
(2) Date: Jun. 3, 2022

(87) PCT Pub. No.: WO2021/112370
PCT Pub. Date: Jun. 10, 2021

(65) Prior Publication Data
US 2022/0378979 A1    Dec. 1, 2022

(30) Foreign Application Priority Data
Dec. 4, 2019  (KR) .......... 10-2019-0159750

(51) Int. Cl.
*A61F 2/14*    (2006.01)
*A61L 27/36*   (2006.01)

(52) U.S. Cl.
CPC ....... *A61L 27/3604* (2013.01); *A61L 27/3687* (2013.01); *A61F 2/142* (2013.01)

(58) Field of Classification Search
CPC .. A61F 9/00736; A61F 9/00754; A61F 9/013; A61B 17/326; A61B 17/32053; A61B 10/02
See application file for complete search history.

(56) References Cited

U.S. PATENT DOCUMENTS

| 4,824,066 A | 4/1989 | Smith |
| 5,019,084 A | 5/1991 | Aysta et al. |
| 5,616,139 A * | 4/1997 | Okamoto ............... A61F 9/008 606/4 |

FOREIGN PATENT DOCUMENTS

| CN | 201055463 | 5/2008 |
| JP | H08117266 | 5/1996 |

(Continued)

OTHER PUBLICATIONS

WO 2017158490 Espacenet translation (Year: 2017).*

(Continued)

*Primary Examiner* — Katherine H Schwiker
*Assistant Examiner* — Zehra Jaffri
(74) *Attorney, Agent, or Firm* — NORTON ROSE FULBRIGHT US LLP (57) ABSTRACT

A multilayer cornea harvesting apparatus capable of obtaining layers of cornea from one cornea enucleation object and a cornea harvesting method is disclosed. The apparatus includes a base supported on a bottom surface, a mount detachably coupled to the base, allowing a cornea enucleation object to be placed thereon, having a first opening part formed at a portion corresponding to the cornea of the cornea enucleation object, and having a first medicinal fluid charging space formed between the base and the mount, a stabilizer fixing, to the mount, a sclera portion of the cornea (Continued)

enucleation object placed on the mount and having a second opening part formed at a portion corresponding to the cornea, and an upper cover detachably provided on the upper side of the cornea, supported by the mount or supporting the mount, and forming a second medicinal fluid charging space on the upper side of the cornea.

15 Claims, 7 Drawing Sheets

(56) References Cited

FOREIGN PATENT DOCUMENTS

| | | | |
|---|---|---|---|
| KR | 101811943 | 12/2017 | |
| KR | 101875569 | 7/2018 | |
| WO | WO 1994/09849 | 5/1994 | |
| WO | WO-2017158490 A1 * | 9/2017 | ............ A61F 2/142 |

OTHER PUBLICATIONS

International Search Report and Written Opinion issued in Corresponding PCT Application No. PCT/KR2020/010481, dated Nov. 24, 2019 (English Translation provided).

* cited by examiner

MULTILAYER CORNEA HARVESTING APPARATUS AND CORNEA HARVESTING METHOD USING SAME

CROSS-REFERENCE TO RELATED APPLICATION

This application is a national phase application under 35 U.S.C. § 371 of International Application No. PCT/KR2020/010481, filed Aug. 7, 2020, which claims priority to and the benefit of Korean Application No. 10-2019-0159750, filed Dec. 4, 2019. The contents of the referenced patent applications are incorporated into the present application by reference.

FIELD OF THE DISCLOSURE

The present invention relates to a multilayer cornea harvesting apparatus and a cornea harvesting method using the same, and more particularly, to a multiplayer cornea harvesting apparatus capable of obtaining several layers of cornea from one cornea enucleation object, and a corneal harvesting method using the same.

DESCRIPTION OF RELATED ART

Corneal transplantation is a surgical method that restores the function of an eyeball by transplanting a new cornea secured through donation, etc., when the patient's cornea becomes impaired due to irreversible functional damage or opacity.

If the cornea fails to maintain its transparency and becomes opaque due to trauma, severe inflammation, or other congenital reasons, it may cause visual impairment. In this case, transparency can be restored by excising the patient's cornea and then transplanting the transparent cornea secured through donation.

Meanwhile, in order to obtain a cornea to be transplanted in this way, it is necessary to secure the cornea from a donated eye.

In addition, the cornea consists of several layers. In some cases, the cornea to be transplanted needs to have corneal epithelium, bowman's membrane, and corneal parenchyma; in other cases, corneal endothelium, Descemet membrane, and corneal parenchyma are required.

However, a typical corneal harvesting apparatus harvests only one layer of cornea from one eye, and takes only the necessary part from the harvested cornea and discards the rest. Thus, this method has a problem of wasting valuable cornea.

SUMMARY

The present invention is to solve the above problems, and the present invention provides a multilayer cornea harvesting apparatus capable of obtaining several layers of cornea from one cornea enucleation object and a cornea harvesting method using the same, in order to solve the above problems.

The objects of the present invention are not limited to the objects mentioned above, and other objects not mentioned will be clearly understood by those skilled in the art from the following description.

In order to solve the above object, an embodiment of the present invention provides a multilayer cornea harvesting apparatus including a base supported on a bottom surface, a mount that is detachably coupled to the base, and includes an upper side on which a cornea enucleation object is placed, a first opening part corresponding to a cornea of the cornea enucleation object, and a first medicinal fluid charging space between the mount and the base, a stabilizer that fixes a scleral portion of the cornea enucleation object placed on the mount to the mount, and includes a second opening part corresponding to the cornea, and an upper cover that is detachably provided on an upper side of the cornea, is supported on the mount or supports the mount, and forms a second medicinal fluid charging space on the upper side of the cornea.

A rocker that couples and fixes the mount and stabilizer may be included.

The rocker may fix rims of the mount and the stabilizer.

The upper cover may be supported on the mount or supports the mount by being coupled to the rocker.

The upper cover may include a support surface formed on an upper surface of the upper cover so as to support the mount and the stabilizer against the bottom surface when the upper cover is turned over so that the upper surface is placed on the bottom surface.

A first medicinal fluid flowing hole may be formed in the base or the mount and form a passage for charging the first medicinal fluid charging space with a first medicinal fluid.

A first medicinal fluid supply pipe coupled to the first medicinal fluid flowing hole may be included to supply the first medicinal fluid.

A second medicinal fluid flowing hole may be formed in the upper cover and form a passage for charging the second medicinal fluid charging space with a second medicinal fluid.

A second medicinal fluid supply pipe coupled to the second medicinal fluid flowing hole may be included to supply the second medicinal fluid.

In addition, another embodiment of the present invention provides a multilayer cornea harvesting apparatus assembly including a multilayer cornea harvesting apparatus including a base supported on a bottom surface; a mount that is detachably coupled to the base, and includes an upper side on which a cornea enucleation object is placed, a first opening part corresponding to a cornea of the cornea enucleation object, and a first medicinal fluid charging space between the mount and the base; a stabilizer that fixes a scleral portion of the cornea enucleation object placed on the mount to the mount, and includes a second opening part corresponding to the cornea; and an upper cover that is detachably provided on an upper side of the cornea, is supported on the mount or supports the mount, and forms a second medicinal fluid charging space on the upper side of the cornea; a first trephine that incises a corneal endothelial side of the cornea enucleation object fixed to the mount and the stabilizer through the first opening part; and a second trephine that incises a corneal epithelial side of the cornea enucleation object fixed to the mount and the stabilizer through the second opening part.

A diameter of the second trephine may be greater than a diameter of the first trephine.

In addition, still another embodiment of the present invention provides a cornea harvesting method using a multilayer cornea harvesting apparatus assembly, wherein the multilayer cornea harvesting apparatus assembly includes a multilayer cornea harvesting apparatus including a base supported on a bottom surface, a mount that is detachably coupled to the base, and includes an upper side on which a cornea enucleation object is placed, a first opening part corresponding to a cornea of the cornea enucleation object, and a first medicinal fluid charging space between the mount and the base, a stabilizer that fixes a scleral portion of the cornea enucleation object placed on the mount to the mount, and includes a second opening part corresponding to the cornea, and an upper cover that is detachably provided on an upper side of the cornea, is supported on the mount or supports the mount, and forms a second medicinal fluid charging space on the upper side of the cornea; a first trephine that incises a corneal endothelial side of the cornea enucleation object fixed to the mount and the stabilizer through the first opening part; and a second trephine that incises a corneal epithelial side of the cornea enucleation object fixed to the mount and the stabilizer through the second opening part, the method includes the steps of a corneal installation step of coupling the mount to the base, placing the cornea enucleation object on the mount, and then fixing the cornea enucleation object with the stabilizer, and then coupling to the upper cover; a first inversion step of, after removing the base from the mount, turning over so that a support surface of the upper cover comes into contact with the bottom surface; an endothelial layer harvesting step of incising and harvesting a portion including a corneal endothelial layer of the cornea enucleation object with the first trephine through the first opening part of the mount; a second inversion step of coupling the mount to the base and removing the upper cover; an epithelial layer harvesting step of, after the second inversion step, incising and harvesting a remaining portion including a corneal epithelium of the cornea enucleation object with the second trephine through the second opening part of the stabilizer.

A diameter of the endothelial layer harvested in the endothelial layer harvesting step may be greater than a diameter of the epithelial layer harvested in the epithelial layer harvesting step.

After the corneal installation step or the first inversion step, the method may further include a second medicinal fluid charging step of charging a second medicinal fluid charging space between the upper cover and the cornea enucleation object with a second medicinal fluid.

After the second inversion step, the method may further include a first medicinal fluid charging step of charging a first medicinal fluid charging space between the base and the mount with a first medicinal fluid.

According to a multilayer cornea harvesting apparatus and a cornea harvesting method using the same of the present invention, a plurality of layers of cornea can be harvested from one cornea enucleation object, and it is possible to prevent the valuable cornea from being wasted, which has the effect of providing cornea to more patients.

The effects of the present invention are not limited to the above-mentioned effects, and other effects not mentioned will be clearly understood by those skilled in the art from the description of the claims.

BRIEF DESCRIPTION OF THE DRAWINGS

The summary set forth above as well as the detailed description of the preferred embodiments of the present application set forth below may be better understood when read in conjunction with the accompanying drawings. For the purpose of illustrating the invention, there are shown in the drawings preferred embodiments. It should be understood, however, that the present application is not limited to the precise arrangements and means shown.

DETAILED DESCRIPTION OF THE INVENTION

Hereinafter, preferred embodiments of the present invention in which the object of the present invention can be specifically realized will be described with reference to the accompanying drawings. In the description of the present embodiment, the same names and the same reference numerals are used for the same components, and an additional description thereof will be omitted.

Hereinafter, a multilayer cornea harvesting apparatus 100 according to an embodiment of the present invention will be described.

Figure 1:
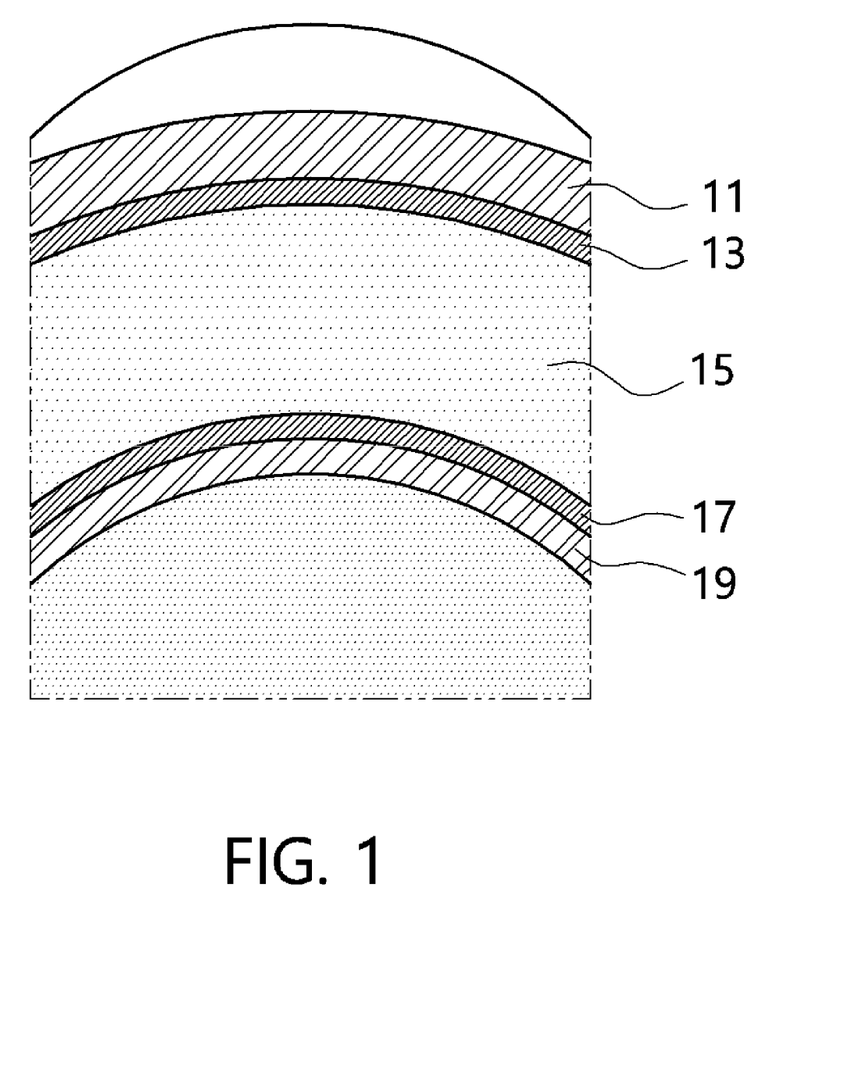
FIG. 1 is a view showing the structure of cornea.

In general, an eyeball contains a sclera 52 called the white and a cornea called the black. Among them, the cornea is formed transparently because light must be transmitted without loss. As shown in FIG. 1, the cornea consists of a corneal epithelium 11, a bowman membrane 13, a corneal parenchyma 15, a Descemet membrane 17, and an innermost corneal endothelium 19.

When harvesting the cornea to be transplanted, a part having a portion of the sclera 52 and the cornea 54 is enucleated from the donor's eye, and then, the corneal part can be harvested such that it is incised and enucleated as necessary from a cornea enucleation object 50. That is, the cornea enucleation object 50 may include the cornea and the portion of sclera 52 at the rim of the cornea. Of course, the present invention is not limited thereto, and it may be a cornea that does not include the sclera 52.

The multilayer cornea harvesting apparatus 100 according to an embodiment of the present invention is an apparatus for harvesting a corneal part from the cornea enucleation object 50 as described above, and as shown in FIG. 2, the apparatus 100 may include a base 110 and a mount 120, a stabilizer 130, a rocker 140 and an upper cover 150.

Figure 2:
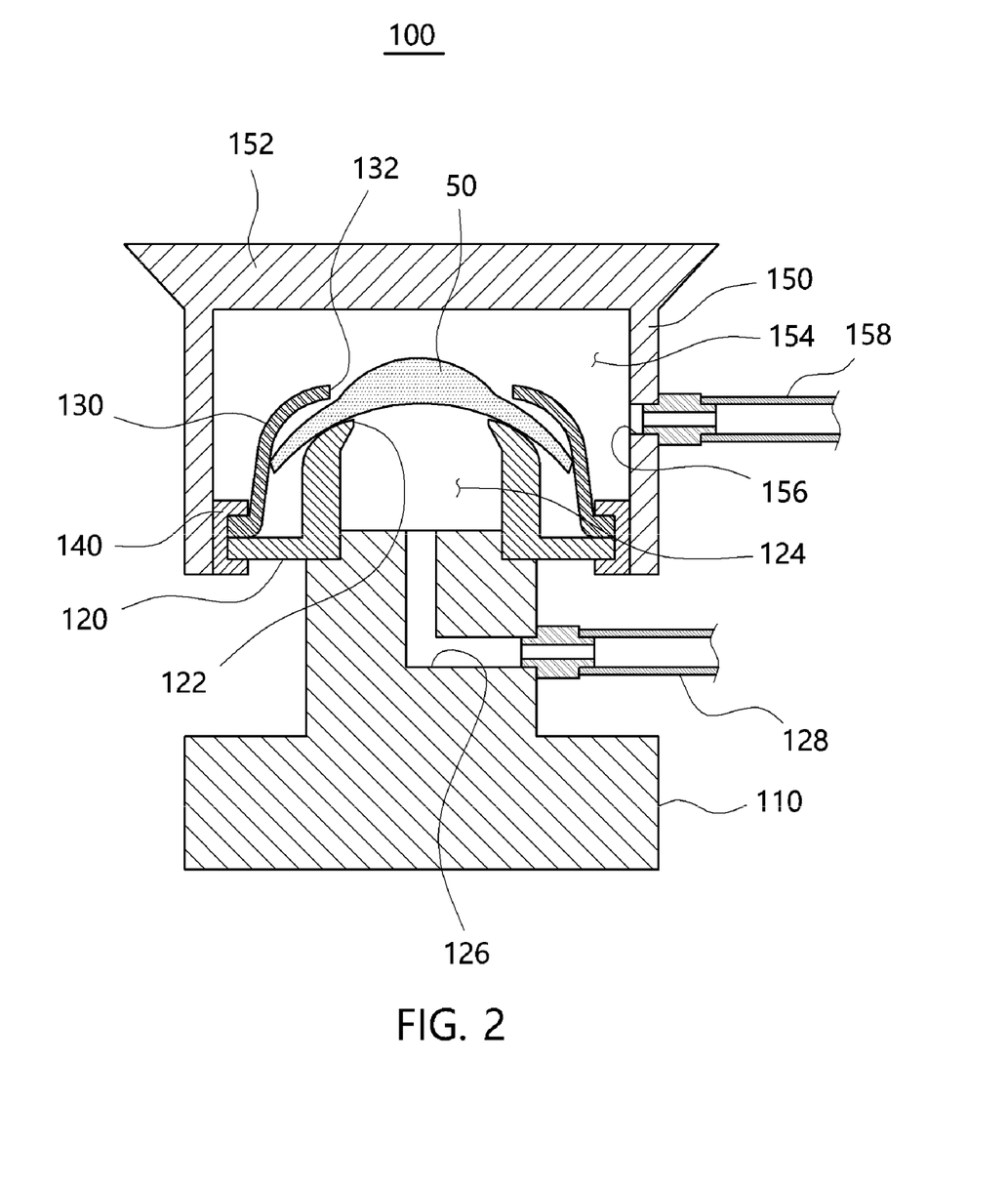
FIG. 2 is a view showing a multilayer cornea harvesting apparatus according to an embodiment of the present invention.

The base 110 is a component that is placed on a bottom surface and supported. To this end, a support surface may be formed on the lower surface of the base 110 in order to be placed on the bottom surface without shaking.

Figure 3:
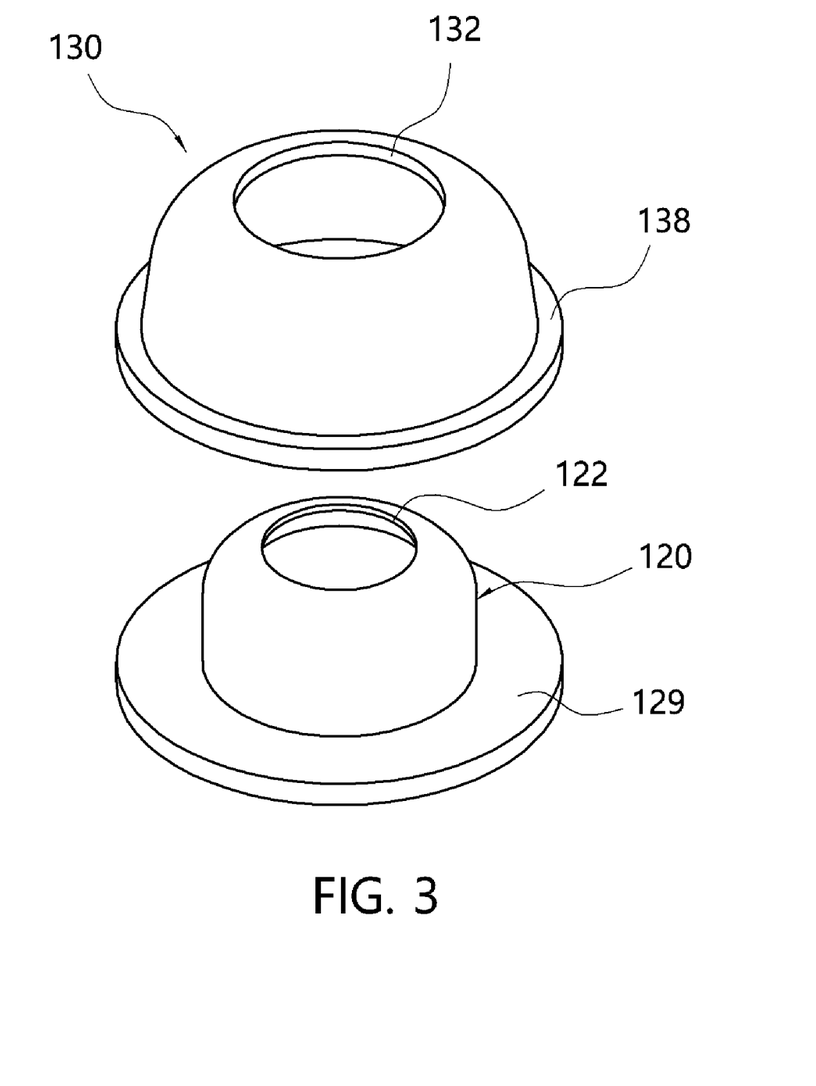
FIG. 3 is a perspective view showing the mount and stabilizer of FIG. 2.

Further, as shown in FIGS. 2 and 3, the mount 120 is detachably coupled to the base 110, and the cornea enucleation object 50 can be placed on the upper side of the mount. In order for the cornea enucleation object 50 to be safely placed on it, the mount 120 may be formed to be approximately round and curved downward toward an edge. In addition, a portion of the cornea enucleation object 50 in contact with the cornea may be opened to form a first opening part 122.

A first medicinal fluid charging space 124 may be formed between the first opening part 122 and the base 110.

The first medicinal fluid charging space 124 is a space formed inside the mount 120 due to the cornea enucleation object 50 placed on the mount 120, the mount 120 and the base 110, and can be filled with a first medicinal fluid.

The first medicinal fluid may be a medicinal fluid containing physiological saline or a component for protecting the cornea enucleation object 50. Because the first medicinal fluid charging space 124 is charged with the first medicinal fluid, the cornea enucleation object 50 can be protected, and an appropriate pressure can be provided to the corneal part of the cornea enucleation object 50.

In addition, a first medicinal fluid flowing hole 126 for injecting and discharging the first medicinal fluid into the first medicinal fluid charging space 124 may be formed in the base 110 or the mount 120. In addition, a first medicinal fluid supply pipe 128 coupled to the first medicinal fluid flowing hole 126 may be provided to supply the first medicinal fluid to the first medicinal fluid flowing hole 126.

The mount 120 is detachably coupled to the upper side of the base 110, but is not necessarily limited thereto.

On the other hand, the stabilizer 130 is a component for fixing the cornea enucleation object 50 placed on the mount 120, as shown in FIGS. 2 and 3. To this end, the stabilizer 130 may be formed to cover the upper side of the mount 120, and is coupled to the mount 120 to fix the corneal enucleation object 50 between the mount 120 and the stabilizer 130. In this case, a second opening part 132 may be formed so that only the sclera 52 part of the cornea enucleation object 50 is pressed and fixed and the cornea part is exposed.

The rocker 140 is a component for fixing the mount 120 and the stabilizer 130. That is, while the rocker 140 fixes the mount 120 and the stabilizer 130, the stabilizer 130 presses and fixes the sclera 52 part of the cornea enucleation object 50 to the mount 120.

The rocker 140 may fix the rims of the mount 120 and the stabilizer 130. To this end, the mount 120 and the stabilizer 130 are formed with flange parts 129 and 138 that protrude outwardly so as to overlap each other at their edges. Accordingly, the rocker 140 can fix the mount 120 and the stabilizer 130 by pressing and fixing the flange parts 129, 138.

Accordingly, in the cornea enucleation object 50, the sclera 52 part is fixed to the mount 120 and the stabilizer 130, and the corneal endothelial of the corneal part may be exposed by the first opening part 122 of the mount 120, and the corneal epithelium may be exposed by the second opening part 132 of the stabilizer 130.

The upper cover 150 is detachably provided on the upper side of the cornea, is supported on the mount 120 or supports the mount 120. A second liquid fluid charging space 154 may be formed on the upper side of the cornea.

That is, the upper cover 150 is coupled to any one of the mount 120, the rocker 140 and the stabilizer 130, and is formed to cover the upper side of the mount 120, the stabilizer 130, and the cornea enucleation object 50. A second medicinal fluid charging space 154 in which a second medicinal fluid is charged is formed on the upper side of the cornea enucleation object 50.

In the present embodiment, the upper cover 150 is coupled to the outer circumferential surface of the rocker 140 as an example, but the present invention is not limited thereto, and the upper cover 150 may be coupled to the stabilizer 130 or the mount 120.

The second medicinal fluid is for protecting the cornea enucleation object 50 or supporting the corneal part not supported by the first opening part 122 and the second opening part 132 by providing an appropriate pressure to the corneal part not supported. The second medicinal fluid may be the same component as the first medicinal fluid or a different component.

In order to charge or discharge the second medicinal fluid into the second medicinal fluid charging space 154, a second medicinal fluid flowing hole 156 may be formed in the upper cover 150. In addition, a second medicinal fluid supply pipe 158 coupled to the second medicinal fluid flowing hole 156 may be provided to supply the second medicinal fluid to the second medicinal fluid flowing hole 156.

The first medicinal fluid supply pipe 128 and the second medicinal fluid supply pipe 158 may be detachably coupled to the first medicinal fluid flowing hole 126 and the second medicinal fluid flowing hole 156, respectively.

In addition, the upper surface of the upper cover 150 may be formed with a support surface 152 to support the mount 120 and the stabilizer 130 without shaking when placed on the bottom surface. For example, the upper cover 150 may be formed to become wider toward the upper side, and the upper surface thereof may be formed to be flat so as to be placed on the bottom surface without shaking.

Figure 4:
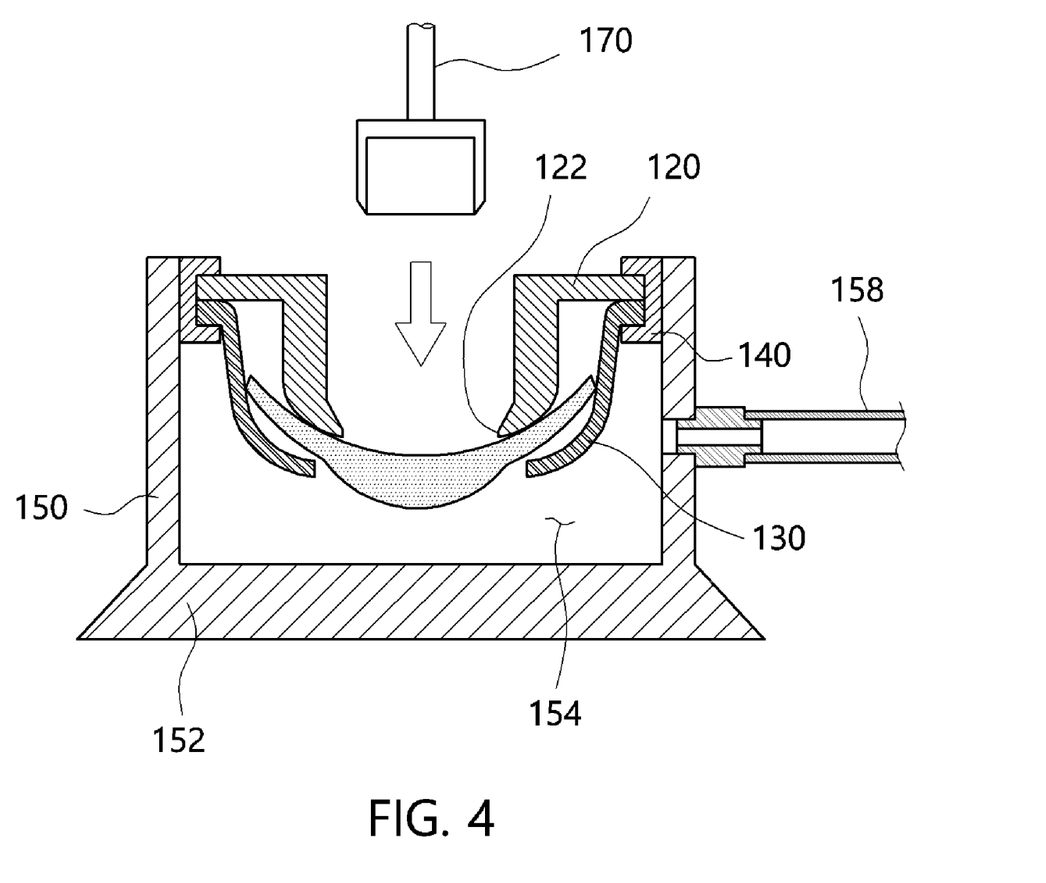
FIG. 4 is a view showing a state in which a portion of a multilayer cornea apparatus is turned upside down in order to harvest an endothelium.

Accordingly, as shown in FIG. 4, the cornea enucleation object 50 is fixed to the mount 120 and the stabilizer 130, and the mount 120 and the stabilizer 130 are coupled by the rocker 140. In the state in which the upper cover is coupled to the rocker 140, the upper cover is inverted so that the upper surface of the upper cover 150 is placed on the bottom surface, so that the corneal endothelial side of the cornea enucleation object 50 is exposed by the first opening part 122 of the mount 120. Accordingly, it may be configured to allow access of the first trephine 170 to the corneal endothelium.

Figure 5:
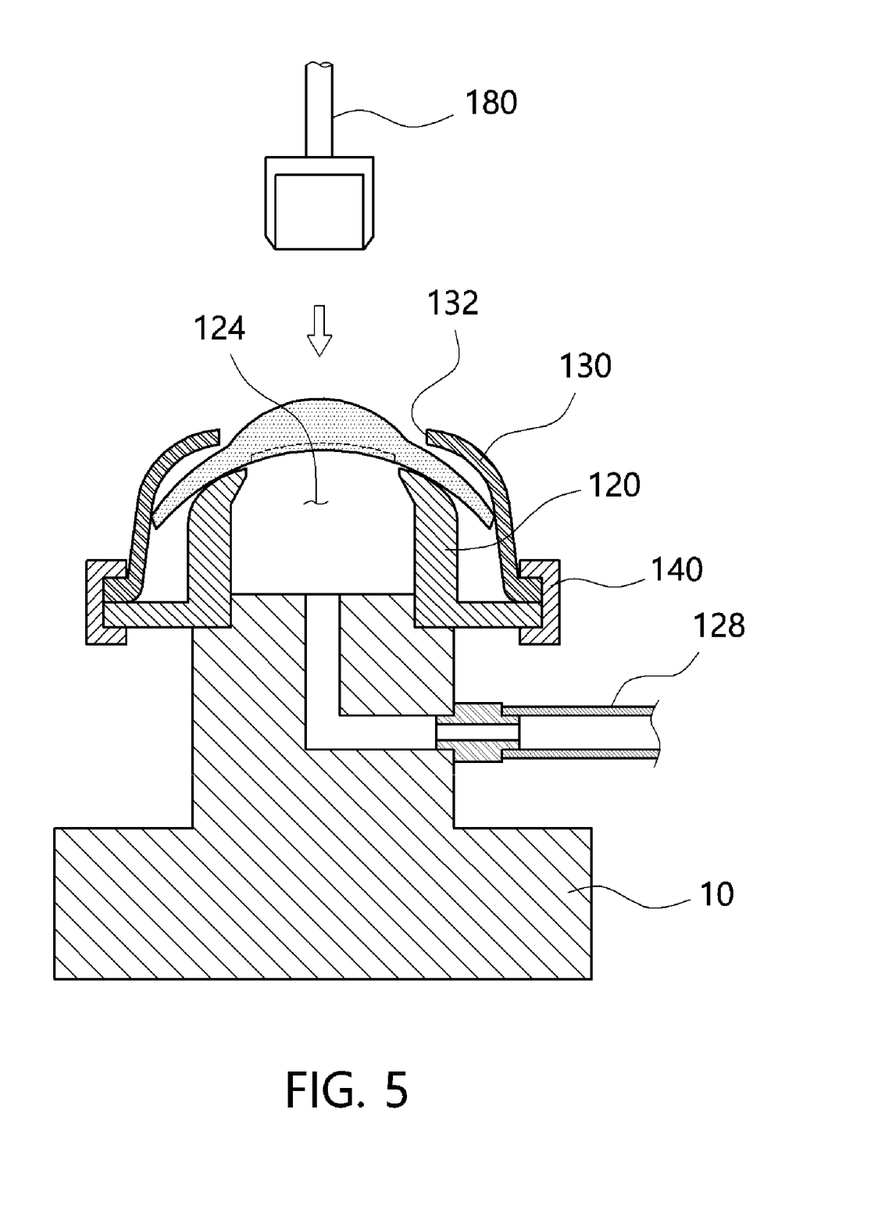
FIG. 5 is a view showing a state in which a multilayer cornea apparatus is erected to harvest an epithelium.

In addition, as shown in FIG. 5, the cornea enucleation object 50 is fixed to the mount 120 and the stabilizer 130, and the mount 120 and the stabilizer 130 are coupled by the rocker 140. In the state in which the mount 120 is coupled to the base 110, it may be provided so that the corneal epithelium side of the cornea enucleation object 50 is exposed by the second opening part 132 of the stabilizer 130, and the second trephine 180 is accessible to the corneal epithelium.

That is, since the first trephine 170 and the second trephine 180 can each be accessed to the corneal epithelial side and the corneal endothelial side of the cornea enucleation object 50, and thus, the part containing the corneal epithelium and the part containing the corneal endothelium can be harvested from one cornea enucleation object 50, respectively.

Figure 6:
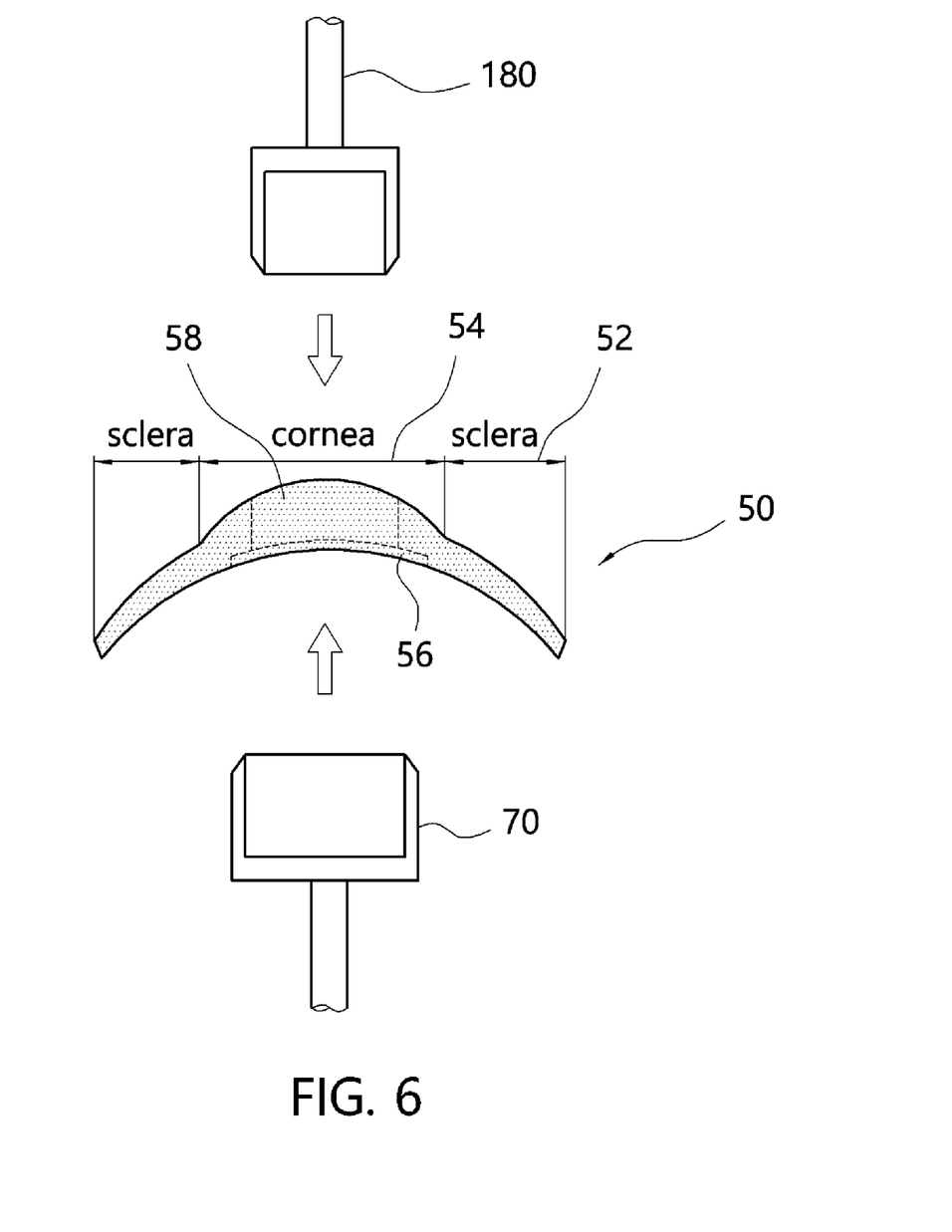
FIG. 6 is a view showing the approach of endothelial trephine for harvesting endothelium and epithelial trephine for harvesting epithelium from a cornea enucleation object.

In this case, as shown in FIG. 6, the corneal endothelial side 56 is incised and harvested so as to include the corneal endothelium, the Descemet membrane, and a portion of the corneal parenchyma, and the corneal epithelial side 58 is incised and harvested so as to include the corneal epithelium, the bowman's membrane and a portion of the corneal parenchyma.

In this case, as shown in FIG. 6, the diameter of the corneal endothelial side 56 to be harvested may be larger than the diameter of the corneal epithelial side 58 to be harvested. If the diameter of the harvested portion on the corneal endothelial side is smaller than the diameter of the harvested portion on the corneal epithelial side, the cells of the corneal endothelial side are present on the corneal epithelium side, and thus, a separate process is required to remove the corneal endothelium and the Descemet membrane.

If the corneal endothelial side is harvested first, and the diameter of the harvested portion on the corneal endothelial side is larger than the diameter of the harvested portion on the corneal epithelial side, the corneal epithelial side is harvested by penetrating the remaining portion after harvesting the corneal endothelial without a separate process, so it can be easily harvested without a separate process.

That is, the diameter of the first trephine 170 for harvesting the corneal endothelial side is larger than the diameter of the second trephine 180 for harvesting the corneal epithelial side.

In addition, the above-described base 110, mount 120, stabilizer 130, upper cover 150, first trephine 170, second trephine 180 may form a multilayer cornea harvesting apparatus assembly.

Hereinafter, an embodiment of a method of using the multilayer cornea harvesting apparatus 100 of the present invention will be described.

Figure 7:
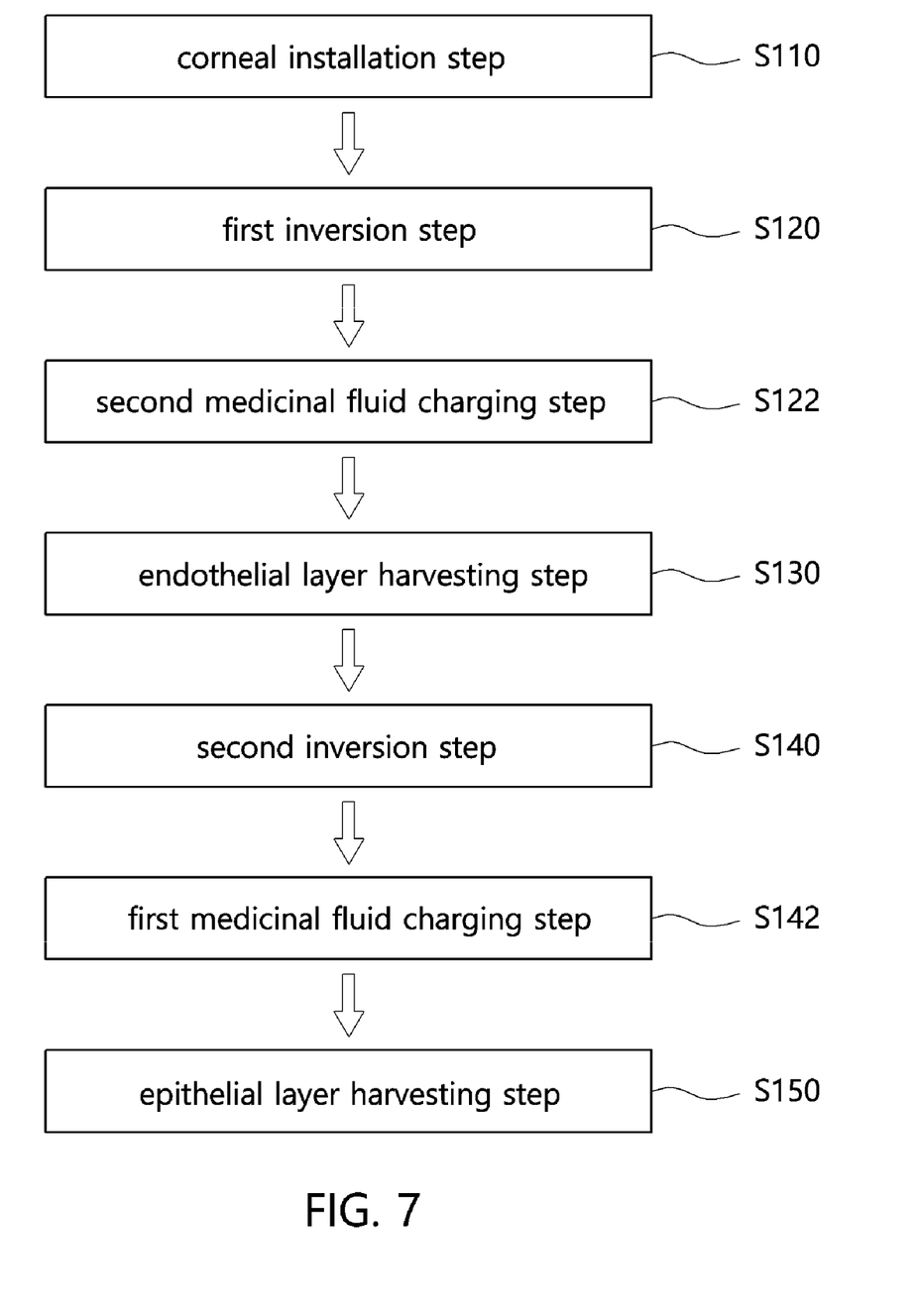
FIG. 7 is a flow chart showing an embodiment of a method of using a multilayer cornea harvesting apparatus of the present invention.

As shown in FIG. 7, the method of using the multilayer cornea harvesting apparatus 100 according to this embodiment may include a corneal installation step (S110), a first inversion step (S120), an endothelial layer harvesting step (S130), a second inversion step (S140), an epithelial layer harvesting step (S150).

In the corneal installation step (S110), as shown in FIG. 2, the mount 120 is coupled to the base 110, and the cornea enucleation object 50 is placed on the mount 120. Then, the cornea enucleation object 50 is fixed with the stabilizer 130, and then coupled to the upper cover 150.

In the first inversion step (S120), after removing the base 110 from the mount 120, as shown in FIG. 4, an inversion can be made such that the support surface 152 of the upper cover 150 can come in contact with the bottom surface. Accordingly, the rocker 140, the mount 120, and the stabilizer 130 coupled to the upper cover 150 and the cornea enucleation object 50 fixed to the mount 120 and the stabilizer 130 can be all inverted.

After the corneal installation step (S110) or the first inversion step (S120), a second medicinal fluid charging step (S122) can be conducted to charge the second medicinal fluid in the second medicinal fluid charging space 154. By charging the second medicinal fluid in the second medicinal fluid charging step (S122), the cornea enucleation object 50 is protected, and the operation of incising the cornea enucleation object 50 can be made easier by supporting the cornea enucleation object 50 with an appropriate pressure.

In the state inverted through the first inversion step (S120), the endothelial layer harvesting step (S130) may be performed. The endothelial layer harvesting step (S130) is a step of incising and harvesting a portion including the corneal endothelial layer of the cornea enucleation object 50 with the trephine through the first opening part 122 of the mount 120.

Then, the second inversion step (S140) may be performed. In the second inversion step (S140), as shown in FIG. 5, the mount 120 overturned in the first inversion step S120 is inverted again to be coupled to the base 110, and the upper cover 150 can be removed in that state. Accordingly, the corneal epithelial layer may be exposed to the outside through the second opening part 132 of the stabilizer 130.

After the second reversion step (S140), a first medicinal fluid charging step (S142) of charging the first medicinal fluid charging space 124 with the first medicinal fluid may be performed. By charging the first medicinal fluid charging space 124 with the first medicinal fluid in the first medicinal fluid charging step (S142), the cornea enucleation object 50 is protected, and the operation of incising the cornea enucleation object 50 can be made easier by supporting the cornea enucleation object 50 with an appropriate pressure.

Then, the epithelial layer harvesting step (S150) may be performed. The epithelial layer harvesting step (S150) is the step of incising and harvesting the remaining portion including the corneal epithelium of the cornea enucleation object 50 with the trephine through the second opening part 132 of the stabilizer 130, after the second inversion step (S140).

In this case, the diameter of the endothelial layer harvested in the endothelial layer harvesting step (S130) may be greater than the diameter of the epithelial layer harvested in the epithelial layer harvesting step (S150). If the diameter of the harvested corneal endothelial layer is smaller than the diameter of the harvested corneal epithelial layer, the cells of the corneal endothelial layer are present in the harvested corneal epithelial layer, and a separate process for separately removing the corneal endothelium and the Descemet membrane is required.

Therefore, if the corneal endothelial layer is first harvested, and the diameter of the corneal endothelial layer to be harvested is greater than the diameter of the harvested corneal epithelial layer, the corneal epithelial layer can be harvested by penetrating the remaining portion after harvesting the corneal endothelial layer without a separate process, so it can be harvested easily without an additional separate process.

As described above, preferred embodiments according to the present invention have been reviewed, and it will be apparent to those skilled in the art that the present invention can be embodied in other specific forms without departing from the spirit or scope of the present invention in addition to the above-described embodiments. Therefore, the above-described embodiments are to be regarded as illustrative rather than restrictive, and accordingly, the present invention is not limited to the above description, but may be modified within the scope of the appended claims and their equivalents.

The invention claimed is:

1. A multilayer cornea harvesting apparatus comprising:
a base supported on a bottom surface;
a mount that is detachably coupled to the base, and includes an upper side on which a cornea enucleation object of a cornea is configured to be placed, thereby forming a first opening part that is configured to expose a corneal endothelial side, and forms a space into which a first trephine for incising the corneal endothelial side enters, and a first medicinal fluid charging space between the mount and the base in which a first medicinal fluid for supporting the corneal endothelial side exposed by the first opening part is charged;
a stabilizer that is configured to fix a scleral portion of the cornea enucleation object placed on the mount to the mount, thereby forming a second opening part that exposes the corneal epithelial side, and forms a space into which a second trephine for incising the corneal epithelial side enters; and
an upper cover that is configured to be detachable to an upper side of the cornea, is supported on the mount or supports the mount, and forms a second medicinal fluid charging space which when in use is on the upper side of the cornea in which a second medicinal fluid for supporting the corneal epithelial side exposed by the second opening part is charged.

2. The multilayer cornea harvesting apparatus according to claim 1, further comprising a rocker that couples and fixes the mount and stabilizer.

3. The multilayer cornea harvesting apparatus according to claim 2, wherein the rocker fixes rims of the mount and the stabilizer.

4. The multilayer cornea harvesting apparatus according to claim 3, wherein the upper cover is supported on the mount or supports the mount by being coupled to the rocker.

5. The multilayer cornea harvesting apparatus according to claim 1, wherein the upper cover includes a support surface formed on an upper surface of the upper cover so as to support the mount and the stabilizer against the bottom surface when the upper cover is turned over so that the upper surface is placed on the bottom surface.

6. The multilayer cornea harvesting apparatus according to claim 1, further comprising a first medicinal fluid flowing hole formed in the base or the mount and forming a passage for charging the first medicinal fluid charging space with a first medicinal fluid.

7. The multilayer cornea harvesting apparatus according to claim 6, further comprising a first medicinal fluid supply pipe coupled to the first medicinal fluid flowing hole to supply the first medicinal fluid.

8. The multilayer cornea harvesting apparatus according to claim 1, further comprising a second medicinal fluid flowing hole formed in the upper cover and forming a passage for charging the second medicinal fluid charging space with a second medicinal fluid.

9. The multilayer cornea harvesting apparatus according to claim 8, further comprising a second medicinal fluid supply pipe coupled to the second medicinal fluid flowing hole to supply the second medicinal fluid.

10. A multilayer cornea harvesting apparatus assembly comprising:
    a multilayer cornea harvesting apparatus comprising a base supported on a bottom surface;
    a mount that is detachably coupled to the base, and includes an upper side on which a cornea enucleation object of a cornea is configured to be placed, thereby forming a first opening part that is configured to expose a corneal endothelial side, and a first medicinal fluid charging space between the mount and the base in which a first medicinal fluid for supporting the corneal endothelial side exposed by the first opening part is charged;
    a stabilizer that is configured to fix a scleral portion of the cornea enucleation object placed on the mount to the mount, thereby forming a second opening part is configured to expose the corneal epithelial side
    an upper cover that is configured to be detachable to an upper side of the cornea, is supported on the mount or supports the mount, and forms a second medicinal fluid charging space on the upper side of the cornea in which a second medicinal fluid for supporting the corneal epithelial side exposed by the second opening part is charged;
    a first trephine that is configured to incise a corneal endothelial side of the cornea enucleation object fixed to the mount and the stabilizer through the first opening part; and
    a second trephine that is configured to incise a corneal epithelial side of the cornea enucleation object fixed to the mount and the stabilizer through the second opening part.

11. The multilayer cornea harvesting apparatus assembly according to claim 10, wherein a diameter of the second trephine is greater than a diameter of the first trephine.

12. A cornea harvesting method using a multilayer cornea harvesting apparatus assembly, wherein the multilayer cornea harvesting apparatus assembly comprises a multilayer cornea harvesting apparatus comprising a base supported on a bottom surface, a mount that is detachably coupled to the base, and includes an upper side on which a cornea enucleation object is placed, a first opening part that exposes a cornea of the cornea enucleation object, and a first medicinal fluid charging space between the mount and the base, a stabilizer that fixes a scleral portion of the cornea enucleation object placed on the mount to the mount, and includes a second opening part that exposes the cornea, and an upper cover that is detachably provided on an upper side of the cornea, is supported on the mount or supports the mount, and forms a second medicinal fluid charging space on the upper side of the cornea; a first trephine that incises a corneal endothelial side of the cornea enucleation object fixed to the mount and the stabilizer through the first opening part; and a second trephine that incises a corneal epithelial side of the cornea enucleation object fixed to the mount and the stabilizer through the second opening part, the method comprises the steps of;
    a corneal installation step of coupling the mount to the base, placing the cornea enucleation object on the mount, and then fixing the cornea enucleation object with the stabilizer, and then coupling the upper cover to the stabilizer and the mount;
    a first inversion step of, after removing the base from the mount, turning over the upper cover, the stabilizer, and the mount so that a support surface of the upper cover comes into contact with the bottom surface;
    an endothelial layer harvesting step of incising and harvesting a portion including a corneal endothelial layer of the cornea enucleation object with the first trephine through the first opening part of the mount;
    a second inversion step of coupling the mount to the base and removing the upper cover;
    an epithelial layer harvesting step of, after the second inversion step, incising and harvesting a remaining portion including a corneal epithelium of the cornea enucleation object with the second trephine through the second opening part of the stabilizer.

13. The cornea harvesting method according to claim 12, wherein a diameter of the portion including the corneal endothelial layer of the cornea enucleation object harvested in the endothelial layer harvesting step is greater than a diameter of the remaining portion including the corneal epithelium of the cornea enucleation object harvested in the epithelial layer harvesting step.

14. The cornea harvesting method according to claim 12, further comprising, after the corneal installation step or the first inversion step, a second medicinal fluid charging step of charging a second medicinal fluid charging space between the upper cover and the cornea enucleation object with a second medicinal fluid.

15. The cornea harvesting method according to claim 12, further comprising, after the second inversion step, a first medicinal fluid charging step of charging a first medicinal fluid charging space between the base and the mount with a first medicinal fluid.

* * * * *